United States Patent [19]
Georghiades et al.

[11] Patent Number: 5,995,045
[45] Date of Patent: Nov. 30, 1999

[54] METHOD AND SYSTEM OF DOPPLER CORRECTION FOR MOBILE COMMUNICATIONS SYSTEMS

[75] Inventors: Costas N. Georghiades; Predrag Spasojevic, both of College Station, Tex.

[73] Assignee: The Texas A&M University System, College Station, Tex.

[21] Appl. No.: 09/012,197

[22] Filed: Jan. 23, 1998

Related U.S. Application Data

[60] Provisional application No. 60/052,582, Jul. 15, 1997.

[51] Int. Cl.$^6$ .................................. G01S 3/52; G01S 5/02
[52] U.S. Cl. ............................. 342/418; 455/63; 455/296; 375/348
[58] Field of Search .............................. 342/418, 357.03; 455/63, 296; 375/344, 348

[56] References Cited

U.S. PATENT DOCUMENTS

| | | | |
|---|---|---|---|
| 3,940,695 | 2/1976 | Sickles, II | 325/63 |
| 5,007,068 | 4/1991 | Simon et al. | 375/53 |
| 5,023,889 | 6/1991 | Divsalar et al. | 375/27 |
| 5,229,775 | 7/1993 | Sakamoto et al. | 342/160 |
| 5,432,531 | 7/1995 | Siwiak et al. | 342/357 |

*Primary Examiner*—Mark Hellner
*Attorney, Agent, or Firm*—Baker & Botts, L.L.P.

[57] ABSTRACT

Doppler correction system and method comprising receiving a Doppler effected signal comprising a preamble signal (32). A delayed preamble signal (48) may be generated based on the preamble signal (32). The preamble signal (32) may be multiplied by the delayed preamble signal (48) to generate an in-phase preamble signal (60). The in-phase preamble signal (60) may be filtered to generate a substantially constant in-phase preamble signal (62). A plurality of samples of the substantially constant in-phase preamble signal (62) may be accumulated. A phase-shifted signal (76) may also be generated based on the preamble signal (32). The phase-shifted signal (76) may be multiplied by the delayed preamble signal (48) to generate an out-of-phase preamble signal (80). The out-of-phase preamble signal (80) may be filtered to generate a substantially constant out-of-phase preamble signal (82). A plurality of samples of the substantially constant out-of-phase signal (82) may be accumulated. A sum of the in-phase preamble samples and a sum of the out-of-phase preamble samples may be normalized relative to each other to generate an in-phase Doppler estimator (92) and an out-of-phase Doppler estimator (94).

45 Claims, 3 Drawing Sheets

METHOD AND SYSTEM OF DOPPLER CORRECTION FOR MOBILE COMMUNICATIONS SYSTEMS

RELATED APPLICATIONS

This application claims the benefit of U.S. Provisional Application Ser. No. 60/052,582, filed Jul. 15, 1997.

CONTRACT

This invention was made with government support under NAGW-1194 awarded by NASA. The government has certain rights in this invention.

TECHNICAL FIELD OF THE INVENTION

This invention relates generally to mobile communications systems, and more particularly to a method and system of Doppler correction for a mobile communications system.

BACKGROUND OF THE INVENTION

Mobile communications systems include earth-to-space satellite links, communications involving high speed aircraft and other types of communications systems in which a receiver moves relative to a transmitter. The relative movement of the receiver to the transmitter may cause an effective change in frequency of the received signal. This effective change in frequency is known as the Doppler effect. The Doppler effect must be rectified in order to achieve efficient data transmission and reception.

A standard technique for Doppler correction is to use frequency-tracking loops. Frequency-tracking loops usually require substantial time for acquisition. Additionally, frequency-tracking loops have a limited lock-in range and can only handle relatively small Doppler offsets. Moreover, frequency-tracking loops invariably work only in passband, and thus do not correct for other transmission defects besides Doppler.

SUMMARY OF THE INVENTION

Accordingly, a need has arisen in the art for an improved system and method of Doppler correction. The present invention provides a method and system of Doppler correction for mobile communications systems that substantially reduces or eliminates problems associated with prior Doppler correction systems.

In accordance with the present invention, a Doppler offset of a Doppler effected signal may be estimated by receiving a preamble signal with a date signal. A delayed preamble signal may be generated based on the preamble signal. The preamble signal may be multiplied by the delayed preamble signal to generate an in-phase preamble signal. The in-phase preamble signal may be filtered to generate a substantially constant in-phase preamble signal. A plurality of samples of the substantially constant in-phase preamble signal may then be accumulated. A phase-shifted signal may also be generated based on the preamble signal. The phase-shifted signal may be multiplied by the delayed preamble signal to generate an out-of-phase preamble signal. The out-of-phase preamble signal may be filtered to generate a substantially constant out-of-phase preamble signal. A plurality of samples of the substantially constant out-of-phase signal may then be accumulated. A sum of the in-phase preamble samples and a sum of the out-of-phase preamble samples may be normalized relative to each other to generate an in-phase Doppler estimator and an out-of-phase Doppler estimator.

More specifically, in accordance with one embodiment of the present invention, the signal may comprise Gaussian Minimum Shift Keying (GMSK) differentially detected signal. The preamble signal may comprise a sequence of zeros and the filters may be low pass filters (LPF). The phase-shifted preamble signal may be a quadrature of the preamble signal. In this embodiment, the in-phase Doppler estimator may comprise a sine of the Doppler offset and the out-of-phase Doppler estimator may comprise a cosine of the Doppler offset.

In accordance with another aspect of the present invention, the Doppler offset of the data signal may be corrected by generating a delayed signal based on the data signal. The data signal may be multiplied by the delayed signal to generate an in-phase data signal. The in-phase data signal may be multiplied by the in-phase Doppler estimator to generate a Doppler corrected in-phase data signal. A phase-shifted data signal may also be generated based on the data signal. The phase-shifted data signal may be multiplied by the delayed data signal to generate an out-of-phase data signal. The out-of-phase data signal may be multiplied by the out-of-phase Doppler estimator to generate a Doppler corrected out-of-phase data signal. The Doppler corrected in-phase data signal and the Doppler corrected out-of-phase data signal may be combined to generate a Doppler corrected data signal.

In one embodiment, the in-phase data signal and the out-of-phase data signal may each be independently filtered. The filters may be low pass filters (LPF). In another embodiment, the Doppler corrected data signal may instead be filtered.

Technical advantages of the present invention include providing an improved mobile communications system. In particular, the mobile communications system may work on passband and baseband samples to correct for Doppler offsets. The mobile communications system may correct for large Doppler offsets and other non-ideal effects that reduce performance, such as non-perfectly orthogonal quadrature components.

Another technical advantage of the present invention includes providing an improved method and system of Doppler correction. In particular, a specifically designated preamble may be transmitted when communication is initiated in order to correct for the effects of Doppler offset. Doppler estimators may be determined from the preamble and applied to a data signal following the preamble.

Other technical advantages of the present invention will be readily apparent to one skilled in the art from the following figures, description and claims.

BRIEF DESCRIPTION OF THE DRAWINGS

For a more complete understanding of the present invention and its advantages thereof, reference is now made to the following description taken in conjunction with the accompanying drawings, wherein like reference numerals represent like parts, in which.

DETAILED DESCRIPTION OF THE INVENTION

The preferred embodiments of the present invention and its advantages are best understood by referring now in more detail to FIGS. 1–5 of the drawings, in which like numerals refer to like parts throughout the several views. FIGS. 1–5 illustrate a method and system of Doppler correction for mobile communications systems. As described in more detail below, the method and system employs a specifically designed preamble transmitted when communication is first initiated in order to correct for the effects of Doppler offset. The method and system is easily digitally implemented, works on passband and baseband samples, corrects for large Doppler offsets and other non-ideal effects that reduce performance.

Figures 1, 2:
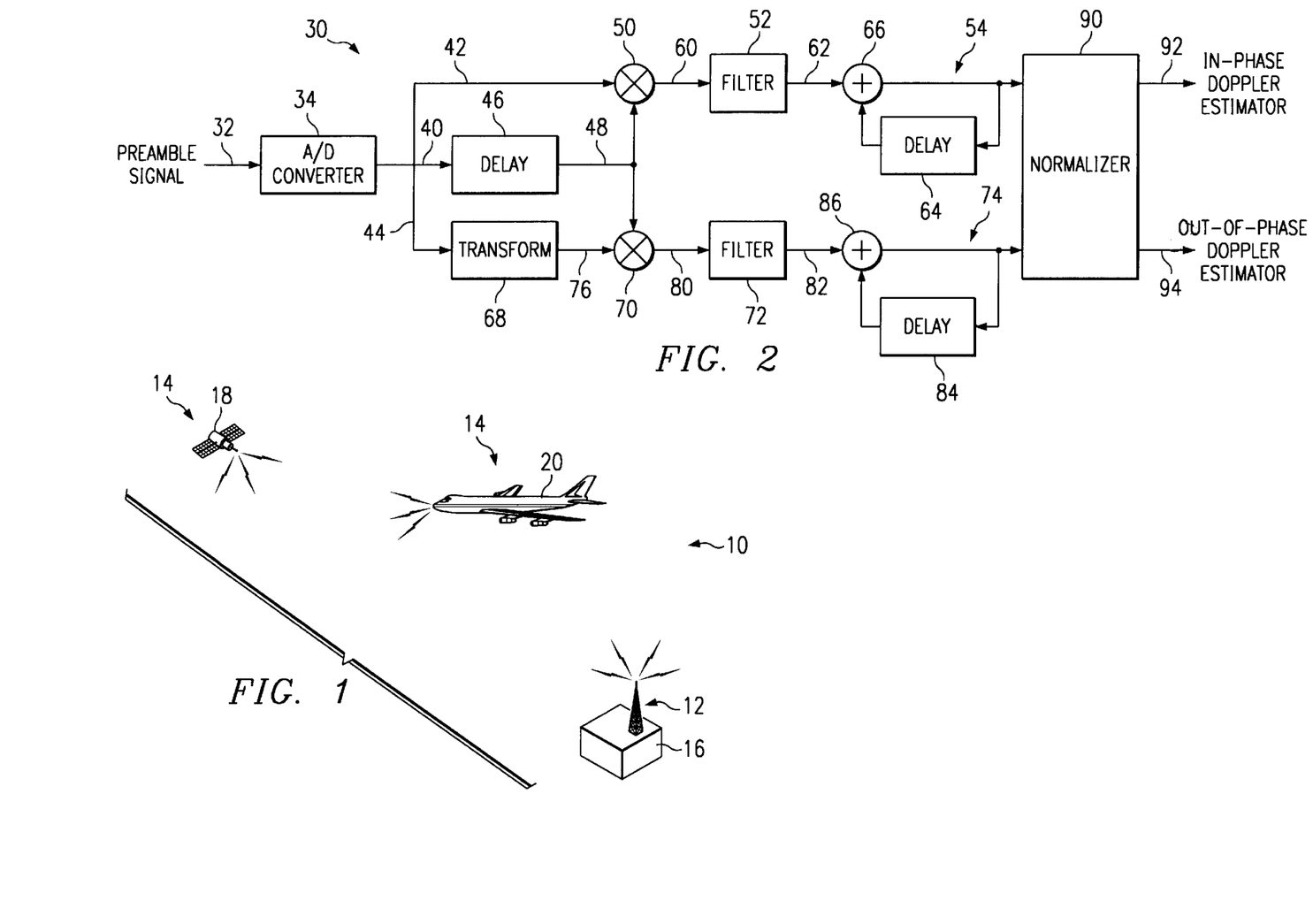
FIG. 1 is an overview of a mobile communications system in accordance with one embodiment of the present invention.
FIG. 2 is a block diagram illustrating a Doppler estimation system in accordance with one embodiment of the present invention.

FIG. 1 is an overview of a mobile communications system 10 in accordance with one embodiment of the present invention. The mobile communications system may comprise a stationary object 12 and a moving object 14. The stationary object 12 may comprise a ground station 16 or the like. The moving object 14 may comprise a satellite 18, a high speed aircraft 20 or the like. It will be understood that the mobile communications system 10 may comprise other types of objects moving relative to one another without departing from the scope of the present invention. For example, the mobile communications system 10 may comprise a plurality of moving objects such as high speed aircraft 20 and the like.

The objects 12 and 14 may each include a transmitter and a receiver to send and receive signals. In one embodiment, the signals may be sent in burst-mode, such as in a pocket radio application. It will be understood that signals may be otherwise sent and received without departing from the scope of the present invention. In the radio pocket and other embodiments, the signals may be Gaussian Minimum Shift Keying (GMSK) signals. In this embodiment, a carrier wave may be modulated by data at a transmitter and demodulated at the receiver to decode the transmitted data. It will be understood that other types of signals may be used without departing from the scope of the present invention.

In accordance with the present invention, signals transmitted and received between the objects 12 and 14 of the mobile communications system 10 may comprise a predefined preamble signal followed by a random data signal. Preferably, the preamble and data signals are transmitted together within a short time period such as in a burst-mode application such that the preamble and data signals have a same or similar Doppler offset. As described in more detail below, the predefined preamble signal may be used to estimate the Doppler offset of the data signal. The estimated Doppler offset may then be applied to the data signal to correct for the Doppler offset.

As described in more detail below, the preamble signal is preferably configured such that filtered in-phase and out-of-phase preamble signals are substantially constant. In a two-bit differential detector embodiment, the preamble signal may comprise an information sequence of all zeros. It will be understood that the information sequence of the preamble may be varied without departing from the scope of the present invention.

The length of the information sequence may also be varied without departing from the scope of the present invention. Generally, estimation of the Doppler offset improves with the length of the preamble. In the two-bit differential detector embodiment, the preamble signal may comprise a sequence of sixteen zeros. It will be understood that the preamble signal may comprise other length without departing from the scope of the present invention. For example, a shorter information sequence may be used for the preamble signal at the loss of some performance.

FIG. 2 illustrates a Doppler estimation system 30 in accordance with one embodiment of the present invention. As described below, the Doppler estimation system 30 may use the preamble signal to determine Doppler estimators that may be used to correct the Doppler offset of the data signal.

The Doppler estimation system 30 may receive a preamble signal 32 may be received from a receiver of one of the objects 12 and 14 of the mobile communications system 10. The preamble signal 32 may be an intermediate frequency (IF) signal. The preamble signal 32 may be digitized by an analog-to-digital (A/D) converter 34 for processing by the Doppler estimation system 30. It will be understood that the preamble signal may comprise other forms or be otherwise received without departing from the scope of the present invention.

The Doppler estimation system 30 may comprise a delay channel 40, an in-phase channel 42 and an out-of-phase channel 44. The delay channel 40 may comprise a delay 46 to generate a delayed preamble signal 48 based on the digitized preamble signal 32. In the two-bit differential detector embodiment, the delay 46 may also be two bits. It will be understood that the delay 46 may be varied without departing from the scope of the present invention. For example, in a one-bit differential detector embodiment, the delay 46 may comprise one bit.

The in-phase channel 42 may be coupled to the receiver to receive the digitized preamble signal 32 and the delay channel 40 to receive the delayed preamble signal 48. The in-phase channel 42 may comprise a first multiplier junction 50, a first filter 52 and a first accumulator 54. It will be understood that the in-phase channel 42 may be otherwise configured without departing from the scope of the present invention.

The first multiplier junction 50 may multiply the digitized preamble signal 32 by the delayed preamble signal 48 to generate an in-phase preamble signal 60. The first filter 52 may filter the in-phase preamble signal 60 to generate a filtered in-phase preamble signal 62. As previously described, the preamble signal 32 is preferably configured such that the in-phase filtered preamble signal 62 as well as the out-of-phase filtered preamble signal are substantially constant in the absence of noise. For the two-bit differential detector embodiment, the preamble signal 32 may comprise a series of sixteen zeros. It will be understood that the preamble signal may be otherwise configured without departing from the scope of the present invention.

In one embodiment, the filter 52 may comprise a low pass filter (LPF). In this embodiment, the low pass filter may remove high frequency components from the in-phase preamble signal 60. It will be understood that the in-phase channel 42 may comprise other filters without departing from the scope of the present invention.

The first accumulator 54 may obtain a plurality of samples of the substantially constant in-phase preamble signal 62. In one embodiment, every other bit of the substantially constant in-phase preamble signal 62 may be sampled. It will be understood that the first accumulator 54 may otherwise sample the substantially constant in-phase preamble signal 62 without departing from the scope of the present invention.

The first accumulator 54 may comprise a delay 64 and an adder 66. In this embodiment, the delay 64 may be set to the sampling period to obtain the samples. The adder 66 may sum the samples for normalization.

The out-of-phase channel 44 may be coupled to the receiver to receive the digitized preamble signal 32 and to the delay channel 40 to receive the delayed preamble signal 48. The out-of-phase channel 44 may comprise a transform 68, second multiplier junction 70, a second filter 72 and a second accumulator 74. The transform 68 may generate a phase-shifted preamble signal 76 based on the preamble signal 32. In one embodiment, the transform 68 may comprise a Hilbert transform. In this embodiment, the phase-shifted preamble signal 76 may comprise a quadrature phase of the preamble signal 32. It will be understood that phase-shifted signal 76 may be otherwise generated without departing from the scope of the present invention.

The second multiplier junction 70 may multiply the phase-shifted preamble signal 76 by the delayed preamble signal 48 to generate an out-of-phase preamble signal 80. The second filter 72 may filter the out-of-phase preamble signal 80 to generate a filtered out-of-phase preamble signal 82. As previously described, the preamble signal 32 is preferably configured such that the out-of-phase filtered preamble signal 82 as well as the in-phase filtered preamble signal 62 are substantially constant. For the two-bit differential detector embodiment, the preamble signal 32 may comprise a series of sixteen zeros. It will be understood that the preamble signal may be otherwise configured without departing from the scope of the present invention.

In one embodiment, the second filter 72 may comprise a low pass filter (LPF). In this embodiment, the low pass filter may remove high frequency components from the out-of-phase preamble signal 80. It will be understood that the out-of-phase channel 44 may comprise other filters without departing from the scope of the present invention.

The second accumulator 74 may obtain a plurality of samples of the substantially constant out-of-phase preamble signal 82. In one embodiment, every other bit of the substantially constant out-of-phase preamble signal 82 may be sampled. It will be understood that the second accumulator 74 may otherwise sample the substantially constant out-of-phase preamble signal 82 without departing from the scope of the present invention.

In one embodiment, the second accumulator 74 may comprise a delay 84 and an adder 86. In this embodiment, the delay 84 may be set to the sampling period to obtain the samples. The adder 86 may sum the samples for normalization.

A normalizer 90 may be coupled to the in-phase channel 42 and the out-of-phase channel 44. The normalizer 90 may normalize the sum of the in-phase preamble samples relative to the sum of the out-of-phase preamble samples to generate an in-phase Doppler estimator 92. The normalizer 92 may normalize the sum of the out-of-phase preamble samples relative to the sum of the in-phase preamble samples to generate an out-of-phase Doppler estimator 94. In one embodiment, the in-phase Doppler estimator 92 may comprise the sine of the Doppler offset and the out-of-phase Doppler estimator 94 may comprise the cosine of the Doppler offset.

The sum of the in-phase and the out-of-phase samples may be normalized by the following equations:

$$x_i = \frac{y_i}{(y_q^2 + y_i^2)^{1/2}}$$

$$x_q = \frac{y_q}{(y_q^2 + y_i^2)^{1/2}}$$

where:

$x_i$=in-phase Doppler estimator $x_q$=out-of-phase Doppler estimator $y_i$=sum of in-phase samples $y_q$=sum of out-of-phase samples It will be understood that the samples may be otherwise normalized without departing from the scope of the present invention. For example, it is not necessary to take the square root. Thus, other normalizations that preserves the angle of the complex number $y_q + jy_i$ may be used.

Figure 3:
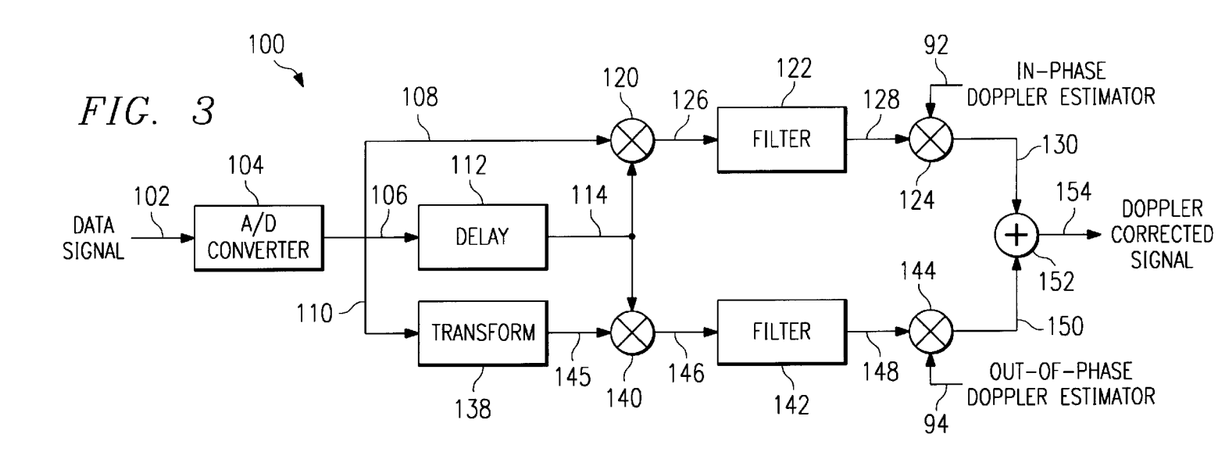
FIG. 3 is a block diagram illustrating a Doppler correction system in accordance with one embodiment of the present invention.

FIG. 3 illustrates a Doppler correction system 100 in accordance with one embodiment of the present invention. As described below, the Doppler correction system 100 may use the in-phase Doppler estimator 92 and the out-of-phase Doppler estimator 94 to correct the Doppler offset of the data signal.

The Doppler correction system 100 may receive a data signal 102 from the receiver of one of the objects 12 and 14 of the mobile communications system 10. The data signal 102 may be an intermediate frequency (IF) signal. The data signal 100 may be digitized by an analog-to-digital (A/D) converter 104 for processing by the Doppler correction system 100. It will be understood that the data signal 102 may comprise other forms or be otherwise received without departing from the scope of the present invention.

The Doppler correction system 100 may comprise a delay channel 106, an in-phase channel 108 and an out-of-phase channel 110. The delay channel 106 may comprise a delay 112 to generate a delayed data signal 114 based on the digitized data signal 102. In the two-bit differential detector embodiment, the delay 112 may also be two bits. It will be understood that the delay 112 may be varied without departing from the scope of the present invention. For example, in a one-bit differential detector embodiment, the delay 112 may comprise one bit.

The in-phase channel 108 may be coupled to the receiver to receive the digitized data signal 102 and the delay channel 106 to receive the delayed data signal 114. The in-phase channel 108 may comprise a third multiplier junction 120, a third filter 122 and a fourth multiplier junction 124. It will be understood that the in-phase channel 108 may be otherwise configured without departing from the scope of the present invention.

The third multiplier junction 120 may multiply the digitized data signal 102 by the delayed data signal 114 to generate an in-phase data signal 126. The third filter 122 may filter the in-phase data signal 126 to generate a filter in-phase data signal 128. In one embodiment, the third filter 122 may comprise a low pass filter (LPF). In this embodiment, the low pass filter may remove high frequency components from the in-phase data signal 126. It will be understood that the in-phase channel 108 may comprise other filters without departing from the scope of the present invention.

The fourth multiplier junction 124 may multiply the filtered in-phase data signal 128 by the in-phase Doppler estimator 92 to generate an in-phase Doppler corrected data signal 130. It will be understood that the in-phase Doppler corrected data signal 130 may be otherwise generated without departing from the scope of the present invention.

The out-of-phase channel 110 may comprise a transform 138, a fifth multiplier junction 140, a fourth filter 142, and a sixth multiplier junction 144. The transform 138 may generate a phase-shifted data signal 145 based on the data signal 102. In one embodiment, the transform 138 may comprise a Hilbert transform. In this embodiment, the phase-shifted data signal 145 may comprise a quadrature phase of the data signal 102. It will be understood that the phase-shifted data signal 145 may be otherwise generated without departing from the scope of the present invention.

The fifth multiplier junction 140 may multiply the phase-shifted data signal 145 by the delayed data signal 114 to generate an out-of-phase data signal 146. The fourth filter 142 may filter the out-of-phase data signal 146 to generate a filtered out-of-phase data signal 148. In one embodiment, the fourth filter 142 may comprise a low pass filter (LPF). In this embodiment, the low pass filter may remove high frequency components from the out-of-phase data signal 146. It will be understood that the out-of-phase channel 110 may comprise other filters without departing from the scope of the present invention.

The sixth multiplier junction 144 may multiply the filtered out-of-phase data signal 148 by the out-of-phase Doppler estimator 94 to generate an out-of-phase Doppler corrected data signal 150. It will be understood that the out-of-phase Doppler corrected date signal ISO may be otherwise generated without departing from the scope of the present invention.

An adder 152 may be coupled to the in-phase channel 108 and the out-of-phase channel 110 to combine the in-phase Doppler corrected data signal 130 and the out-of-phase Doppler corrected data signal 150. The adder 152 may add the in-phase Doppler corrected data signal 130 to the out-of-phase Doppler corrected data signal 150 to generate a Doppler corrected data signal 154. It will be understood that the Doppler corrected 154 may be otherwise generated without departing from the scope of the present invention.

Accordingly, the Doppler offset of the data signal 102 may be estimated and corrected through the use of the preamble signal. The method and system function particularly well in applications where the Doppler offset remains relatively unchanged over the period of transmission.

The method and system of the present invention work at baseband and are able to correct for large Doppler offsets and other non-ideal effects that reduce performance. Because substantial acquisition time is not required, the method and system of the present invention is particularly well suited for packet radio applications and other burst-mode communications systems.

It will be understood that the Doppler estimation system 30 and Doppler correction system 100 may include common components to minimize redundancy. Thus, for example, the A/D converter 104 may be the A/D converter 32, the delay 112 may be the delay 46, the third multiplier junction 120 may be the first multiplier junction 50, the third filter 122 may be the first filter 52, the transform 138 may be the transform 68, the fifth multiplier junction 140 may be the second multiplier junction 70, the fourth filter 142 may be the second filter 72 and the like. Thus, the present invention is not limited to separate systems and components and the numerical identification of redundant components does not require separate physical components.

Figure 4:
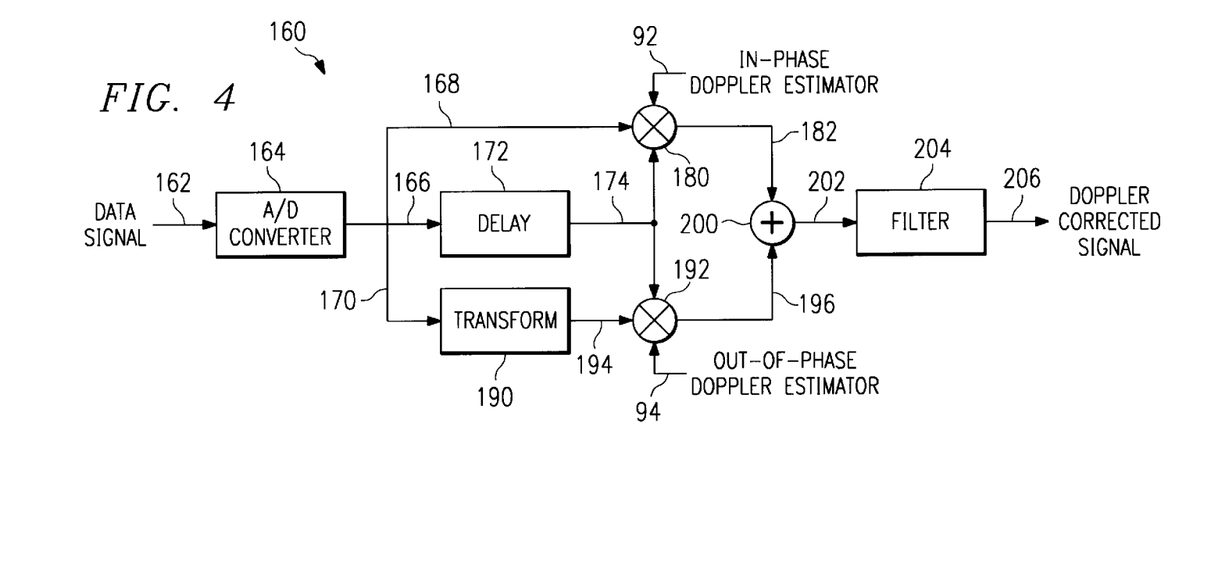
FIG. 4 is a block diagram illustrating a Doppler correction system in accordance with another embodiment of the present invention.

FIG. 4 illustrates a Doppler correction system 160 in accordance with another embodiment of the present invention. As described below, the Doppler correction system 160 may use the in-phase Doppler estimator 92 and the out-of-phase Doppler estimator 94 to correct the Doppler offset of the data signal.

The Doppler correction system 160 may receive a data signal 162 from the receiver of one of the objects 12 and 14 of the mobile communications system 10. As previously described in connection with data signal 102, the data signal 162 may be an IF signal. The data signal 162 may be digitized by an analog-to-digital (A/D) converter 164 for processing by the Doppler correction system 160.

The Doppler correction system 160 may comprise a delay channel 166, an in-phase channel 168 and an out-of-phase channel 170. The delay channel 166 may comprise a delay 172 to generate a delayed data signal 174 based on the digitized data signal 162. In the two-bit differential detector embodiment, the delay 172 may also be two bits. It will be understood that the delay 172 may be varied without departing from the scope of the present invention. For example, in a one-bit differential detector embodiment, the delay 172 may comprise one bit.

The in-phase channel 168 may be coupled to the receiver to receive the digitized data signal 162 and the delay channel 166 to receive the delayed data signal 174. The in-phase channel 168 may comprise a third multiplier junction 180. It will be understood that the in-phase channel 168 may be otherwise configured without departing from the scope of the present invention.

The third multiplier junction 180 may multiply the digitized data signal 162 by the delayed data signal 172 and by the in-phase Doppler estimator 92 to generate an in-phase Doppler corrected data signal 182.

The out-of-phase channel 170 may comprise a transform 190 and a fourth multiplier junction 192. The transform 190 may generate a phase-shifted data signal 194 based on the data signal 162. In one embodiment, the transform 190 may comprise a Hilbert transform. In this embodiment, the phase-shifted data signal 194 may comprise a quadrature phase of the data signal 162. It will be understood that the phase-shifted data signal 194 may be otherwise generated without departing from the scope of the present invention.

The fourth multiplier junction 192 may multiply the phase-shifted data signal 194 by the delayed data signal 174 and the out-of-phase Doppler estimator 94 to generate an out-of-phase Doppler corrected data signal 196.

An adder 200 may be coupled to the in-phase channel 168 and the out-of-phase channel 170 to combine the in-phase Doppler corrected data signal 182 and the out-of-phase Doppler corrected data signal 196. The adder 200 may add the in-phase Doppler corrected data signal 182 to the out-of-phase Doppler corrected data signal 196 to generate an unfiltered Doppler corrected data signal 202. It will be understood that the unfiltered Doppler corrected data signal 202 may be otherwise generated without departing from the scope of the present invention.

A third filter 204 may filter the unfiltered Doppler corrected data signal 202 to generate a Doppler corrected data signal 206. In one embodiment, the third filter 204 may comprise a low pass filter (LPF). In this embodiment, the low pass filter may remove high frequency components from the unfiltered Doppler corrected data signal 202. It will be understood that the Doppler correction system 160 may comprise other filters without departing from the scope of the present invention.

Accordingly, as previously described, the Doppler offset of the data signal 162 may be estimated and corrected through the use of the preamble signal. The system and method functions particularly well in applications where the Doppler offset remains relatively unchanged over the period of transmission.

As previously described in connection with the Doppler correction system 100, the Doppler estimation system 30 and Doppler correction system 160 may include common components to minimize redundancy. Thus, for example, the A/D converter 164 may be the A/D converter 32, the delay 172 may be the delay 46, the third multiplier junction 180 may be the first multiplier junction 50, the transform 190 may be the transform 68, the fourth multiplier junction 192 may be the second multiplier junction 70, the third filter 204 may be the first or second filter 52 or 72 which may be the same and the like.

Figure 5:
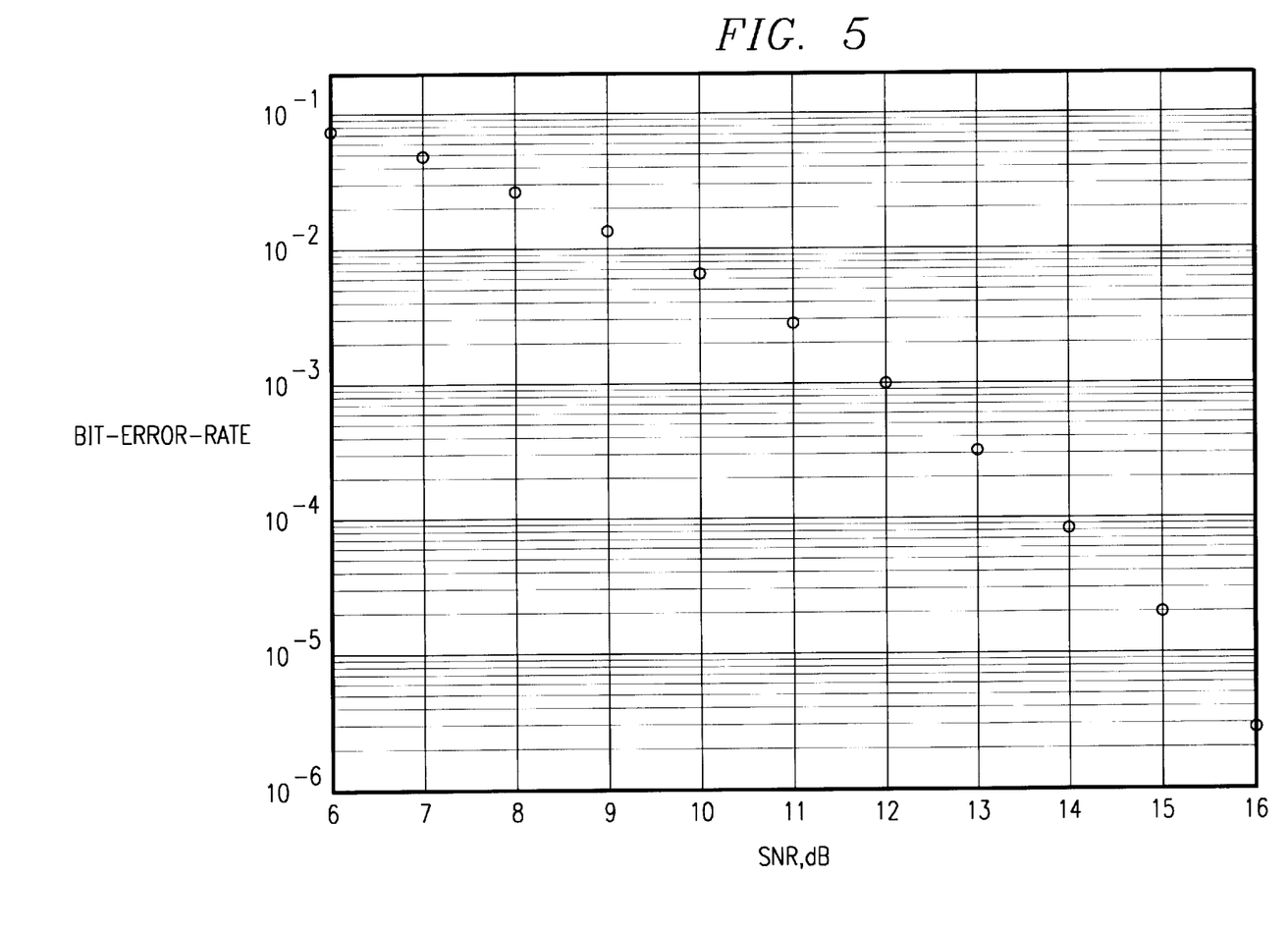
FIG. 5 is a chart demonstrating Doppler correction performance for one embodiment of the present invention.

FIG. 5 is a chart demonstrating Doppler correction performance for one embodiment of the present invention. These numerical results were obtained from an embodiment in which the transforms 68 and 138 are Hilbert transforms and the preamble signal is a sixteen-bit sequence of zeros. The first, second, third and fourth filters 52, 72, 22 and 142 are FIR low pass filters (LPF) having a normalized bandwidth of 0.20. The chart illustrates the average bit-error-rate as a function of signal-to-noise ratio in dB.

Although the present invention has been described with several embodiments, various changes and modifications may be suggested to one skilled in the art. It is intended that the present invention encompass such changes and modifications as fall without departing from the scope of the appended claims.

What is claimed is:

1. A method of estimating a Doppler offset of a signal, comprising the steps of:

receiving a Doppler effected signal comprising a preamble signal;

generating a delayed preamble signal based on the preamble signal;

multiplying the preamble signal by the delayed preamble signal to generate an in-phase preamble signal;

filtering the in-phase preamble signal to generate a substantially constant in-phase preamble signal;

accumulating a plurality of samples of the substantially constant in-phase preamble signal;

generating a phase-shifted preamble signal based on the preamble signal;

multiplying the phase-shifted preamble signal by the delayed preamble signal to generate an out-of-phase preamble signal;

filtering the out-of-phase preamble signal to generate a substantially constant out-of-phase preamble signal;

accumulating a plurality of samples of the substantially constant out-of-phase preamble signal; and normalizing a sum of the in-phase preamble samples and a sum of the out-of-phase preamble samples relative to each other to generate an in-phase Doppler estimator and a out-of-phase Doppler estimator.

2. The method of claim 1, wherein the signal comprises a GMSK differentially detected signal.

3. The method of claim 1, wherein the preamble comprises a sequence of zeros.

4. The method of claim 1, wherein the preamble signal comprises a sequence of sixteen zeros.

5. The method of claim 1, wherein the preamble signal consists of a sequence of sixteen zeros.

6. The method of claim 1, wherein the delayed preamble signal comprises the preamble signal delayed by a two bit interval.

7. The method of claim 1, the step of filtering the in-phase preamble signal to generate the substantially constant in-phase preamble signal comprising the step of filtering high frequency components from the in-phase preamble signal.

8. The method of claim 7, the step of filtering the out-of-phase preamble signal to generate the substantially constant out-of-phase preamble signal comprising the step of filtering high frequency components from the out-of-phase preamble signal.

9. The method of claim 1, the step of accumulating the plurality of samples of the substantially constant in-phase preamble signal comprising the steps of:

periodically obtaining samples of the substantially constant in-phase preamble signal; and summing the obtained in-phase preamble samples.

10. The method of claim 9, wherein the sampling period comprises one bit interval.

11. The method of claim 9, the step of accumulating the plurality of samples of the substantially constant out-of-phase preamble signal comprising the steps of:

periodically obtaining samples of the substantially constant out-of-phase preamble signal; and summing the obtained out-of-phase preamble samples.

12. The method of claim 11, wherein the sampling period comprises one bit interval.

13. The method of claim 1, wherein the phase-shifted preamble signal is a quadrature signal of the preamble signal.

14. The method of claim 1, the step of generating the phase-shifted preamble signal based on the preamble signal comprising the step of applying a Hilbert transform to the preamble signal.

15. The method of claim 1, the step of normalizing the sum of the in-phase preamble samples and the sum of the out-of-phase preamble samples relative to each other further comprising the steps of:

dividing the sum of the in-phase preamble samples by the square root of the sum of the square of the in-phase preamble samples and the square of the out-of-phase preamble samples; and dividing the sum of the out-of-phase preamble samples by the square root of the sum of the square of the out-of-phase preamble samples and the square of the in-phase preamble samples.

16. The method of claim 1, wherein the in-phase Doppler estimator comprises a sine of the Doppler offset and the out-of-phase Doppler estimator comprises a cosine of the Doppler offset.

17. A method of correcting for a Doppler offset of a signal, comprising the steps of:

receiving a Doppler effected signal comprising a preamble signal and a data signal;

generating a delayed preamble signal based on the preamble signal;

multiplying the preamble signal by the delayed preamble signal to generate an in-phase preamble signal;

filtering the in-phase preamble signal to generate a substantially constant in-phase preamble signal;

accumulating a plurality of samples of the substantially constant in-phase preamble signal;

generating a phase-shifted preamble signal based on the preamble signal;

multiplying the phase-shifted preamble signal by the delayed preamble signal to generate an out-of-phase preamble signal;

filtering the out-of-phase preamble signal to generate a substantially constant out-of-phase preamble signal;

accumulating a plurality of samples of the substantially constant out-of-phase preamble signal;

normalizing a sum of the in-phase preamble samples and a sum of the out-of-phase preamble samples relative to each other to generate an in-phase Doppler estimator and a out-of-phase Doppler estimator;

generating a delayed data signal based on the data signal;

multiplying the data signal by the delayed data signal to generate an in-phase data signal;

multiplying the in-phase data signal by the in-phase Doppler estimator to generate a Doppler corrected in-phase data signal;

generating a phase-shifted data signal based on the data signal;

multiplying the phase-shifted data signal by the delayed data signal to generate an out-of-phase data signal;

multiplying the out-of-phase data signal by the out-of-phase Doppler estimator to generate a Doppler corrected out-of-phase data signal; and combining the Doppler corrected in-phase data signal and the Doppler corrected out-of-phase data signal to generate a Doppler corrected data signal.

18. The method of claim 17, wherein the signal comprises a GMSK differentially detected signal.

19. The method of claim 17, wherein the preamble signal comprises a sequence of zeros.

20. The method of claim 17, wherein the preamble signal comprises a sequence of sixteen zeros.

21. The method of claim 17, wherein the preamble signal consists of a sequence of sixteen zeros.

22. The method of claim 17, wherein the delayed preamble signal comprises the preamble signal delayed by two bit intervals and the delayed data signal comprises the data signal delayed by two bit intervals.

23. The method of claim 17, further comprising the step of filtering the in-phase data signal.

24. The method of claim 23, the step of filtering the in-phase preamble signal comprising the step of filtering high frequency components from the in-phase preamble signal and the step of filtering the in-phase data signal comprising the step of filtering high frequency components from the in-phase data signal.

25. The method of claim 17, further comprising the step of filtering the out-of-phase data signal.

26. The method of claim 25, the step of filtering the out-of-phase preamble signal comprising the step of filtering high frequency components from the out-of-phase preamble signal and the step of filtering the out-of-phase data signal comprising the step of filtering high frequency components from the out-of-phase data signal.

27. The method of claim 17, further comprising the step of filtering the Doppler corrected data signal.

28. The method of claim 27, the step of filtering the Doppler corrected data signal further comprising the step of filtering high frequency components from the Doppler corrected data signal.

29. The method of claim 17, wherein the phase-shifted preamble signal is a quadrature signal of the preamble signal and the phase-shifted data signal is a quadrature signal of the data signal.

30. The method of claim 17, the step of generating the phase-shifted preamble signal based on the preamble signal comprising the step of applying a Hilbert transform to the preamble signal and the step of generating the phase-shifted data signal based on the data signal comprising the step of applying a Hilbert transform to the data signal.

31. The method of claim 17, the step of normalizing the sum of the in-phase preamble samples and the sum of the out-of-phase preamble samples relative to each other further comprising the steps of:

dividing the sum of the in-phase preamble samples by the square root of the sum of the square of the in-phase preamble samples and the square of the out-of-phase preamble samples; and dividing the sum of the out-of-phase preamble samples by the square root of the sum of the square of the out-of-phase preamble samples and the square of the in-phase preamble samples.

32. The method of claim 17, wherein the in-phase Doppler estimator comprises a sine of the Doppler offset and the out-of-phase Doppler estimator comprises a cosine of the Doppler offset.

33. A mobile communications system, comprising:

a first object comprising a transmitter to transmit a predefined preamble signal with a data signal;

a second object moving relative to the first object, the second comprising:

a receiver to receive the transmitted preamble signal and the data signal;

a Doppler estimation circuit comprising:

a delay channel coupled to the receiver to generate a delayed preamble signal based on the preamble signal;

an in-phase channel coupled to the receiver and the delay channel, comprising:

a first multiplier junction to multiply the preamble signal by the delayed preamble signal to generate an in-phase preamble signal;

a first filter to generate a substantially constant in-phase preamble signal;

a first accumulator to obtain a plurality of samples of the substantially constant in-phase preamble signal;

an out-of-phase channel coupled to the receiver and the delay channel, comprising:

a transform to generate a phase-shifted preamble signal based on the preamble signal;

a second multiplier junction to multiply the phase-shifted preamble signal by the delayed preamble signal to generate an out-of-phase preamble signal;

a second filter to generate a substantially constant out-of-phase preamble signal;

an second accumulator to obtain a plurality of samples of the substantially constant out-of-phase preamble signal; and a normalizer to normalize a sum of the in-phase preamble samples and a sum of the out-of-phase preamble samples relative to each other to generate an in-phase Doppler estimator and an out-of-phase Doppler estimator.

34. The mobile communications system of claim 33, the transform further comprising a Hilbert Transform.

35. The mobile communications system of claim 33, the first filter further comprising a first low pass filter (LPF) to filter high frequency components from the in-phase preamble signal and the second filter further comprising a second low pass filter (LPF) to filter high frequency components from the out-of-phase preamble signal.

36. The mobile communications system of claim 33, further comprising an analog-to-digital converter to digitize the received preamble signal and data signal.

37. The mobile communications system of claim 33, the received preamble signal and the data signal further comprising GMSK differentially detected signals.

38. The mobile communications system of claim 33, the received preamble signal further comprising a sequence of zeros.

39. The mobile communications system of claim 33, the received preamble signal further comprising a sequence of sixteen zeros.

40. The mobile communications system of claim 33, the received preamble signal further consisting of a sequence of sixteen zeros.

41. The mobile communications system of claim 33, further comprising a Doppler correction circuit, comprising:

a second delay channel coupled to the receiver to generate a delayed data signal based on the data signal;

a second in-phase channel coupled to the receiver and the second delay channel, comprising:

a third multiplier junction to multiply the data signal by the delayed data signal to generate an in-phase data signal;

a fourth multiplier junction to multiply the in-phase data signal by the in-phase Doppler estimator to generate a Doppler corrected in-phase data signal;

a second out-of-phase channel coupled to the receiver and the second delay channel, comprising:

a transform to generate a phase-shifted data signal based on the data signal;

a fifth multiplier junction to multiply the phase-shifted data signal by the delayed data signal to generate an out-of-phase data signal;

a sixth multiplier junction to multiply the out-of-phase data signal by the out-of-phase Doppler estimator to generate a Doppler corrected out-of-phase data signal; and an adder coupled to the second in-phase channel and the second out-of-phase channel to combine the Doppler corrected in-phase data signal and the Doppler corrected out-of-phase data signal to generate a Doppler corrected data signal.

42. The mobile communications system of claim 41, the second in-phase channel further comprising a third filter to filter the in-phase data signal and the second out-of-phase channel further comprising a fourth filter to filter the out-of-phase data signal.

43. The mobile communications system of claim 42, the third filter further comprising a third low pass filter (LPF) to filter high frequency components from the in-phase data signal and the fourth filter further comprising a fourth low pass filter (LPF) to filter high frequency components from the out-of-phase data signal.

44. The mobile communications system of claim 41, the Doppler correction circuit further comprising a third filter coupled to the second in-phase channel and the second out-of-phase channel to filter the Doppler corrected data signal.

45. The mobile communications system of claim 44, the third filter further comprising a third low pass filter (LPF) to filter high frequency components from the Doppler corrected data signal.

\* \* \* \* \*